(12) United States Patent
Bernus

(10) Patent No.: US 7,765,864 B2
(45) Date of Patent: Aug. 3, 2010

(54) DEVICE AND METHOD FOR DETECTING LIGHTNING STRIKES ON A STRUCTURE MADE OF ELECTRICALLY INSULATING MATERIAL

(75) Inventor: Christophe Bernus, Toulouse (FR)

(73) Assignee: Airbus France, Toulouse (FR)

( * ) Notice: Subject to any disclaimer, the term of this patent is extended or adjusted under 35 U.S.C. 154(b) by 190 days.

(21) Appl. No.: 12/041,737

(22) Filed: Mar. 4, 2008

(65) Prior Publication Data

US 2008/0270052 A1     Oct. 30, 2008

(51) Int. Cl.
*G01W 1/00* (2006.01)
(52) U.S. Cl. ............................ 73/170.16; 361/124
(58) Field of Classification Search .................. None
See application file for complete search history.

(56) References Cited

U.S. PATENT DOCUMENTS

| | | | | |
|---|---|---|---|---|
| 3,906,308 A | * | 9/1975 | Amason et al. | 361/218 |
| 4,237,514 A | * | 12/1980 | Cline | 361/117 |
| 4,583,702 A | * | 4/1986 | Baldwin | 244/1 A |
| 4,788,622 A | * | 11/1988 | Cinquin | 361/124 |
| 4,796,153 A | * | 1/1989 | Amason et al. | 361/218 |
| 5,184,215 A | * | 2/1993 | Barker | 348/159 |
| 5,542,624 A | * | 8/1996 | Smith | 244/1 A |
| 5,841,066 A | * | 11/1998 | Bocherens | 174/2 |
| 5,991,138 A | * | 11/1999 | Sklar et al. | 361/118 |
| 2003/0021076 A1 | * | 1/2003 | Sillence et al. | 361/218 |

FOREIGN PATENT DOCUMENTS

| | | |
|---|---|---|
| FR | 2582987 A1 | 12/1986 |
| FR | 2720214 A1 | 11/1995 |

* cited by examiner

*Primary Examiner*—Andre J Allen
(74) *Attorney, Agent, or Firm*—Perman & Green LLP

(57) ABSTRACT

A device for detecting lightning strikes (9) on an electrically insulating structure (11) likely to be subjected to a lightning strike, for example an aircraft radome, includes on an external surface (12) one or more lightning arrester strips (10), made of an electrically conductive material and electrically linked to an electrically conductive structure. At least one inductive sensor (3) is positioned near the internal surface (13) of the electrically insulating structure so that the inductive sensor delivers a signal when a lightning arrester strip is passed through by a lightning current I. The signals from the inductive sensor, for example a flat coil or two flat coils mounted in opposition, are received and processed by acquisition means.

14 Claims, 4 Drawing Sheets

DEVICE AND METHOD FOR DETECTING LIGHTNING STRIKES ON A STRUCTURE MADE OF ELECTRICALLY INSULATING MATERIAL

BACKGROUND

1. Field

The disclosed embodiments relate to the field of safety of the systems that comprise a structure made of insulating material likely to be subjected to lightning strikes. In particular, the disclosed embodiments relate to a device and a method for determining the conditions in which an insulating structure, for example an aircraft radome, is subjected during its use to one or more lightning strikes.

2. Brief Description

The structures exposed to atmospheric conditions, for example those of aircraft, are frequently struck by lightning when the atmospheric conditions are stormy, in particular when aircraft are flying in such conditions. This situation, even if spectacular, is not critical to safety. In the case of aircraft, which will be used as a basis for the rest of the explanation, as in the case of complex systems in general, the integrity of the equipment, electronic in particular, and the safety of the aircraft and of the passengers are not affected because of the precautions taken when designing modern aircraft.

In fact, on the one hand, the structures of the aircraft are generally metallic or, when they are made of a non-conductive material such as an organic compound material, they include electrically conductive materials, as described, for example, in the patent published under the number FR 2 582 987 or even the patent published under the number FR 2 720 214, such that the structure constitutes a Faraday cage around the passengers of the aircraft and the onboard equipment and, on the other hand, everything is done in the design of the aircraft to enable the electrical charges to flow and to be dispersed into the outside air.

However, certain parts of the aircraft, in particular the antenna protections, or radomes, cannot be covered with electrically conductive materials because of their function which requires a radiofrequency transparency that is as pure as possible, which a conventional metallization could not provide.

These radomes 1, as illustrated in FIG. 1, of generally convex shape for aerodynamic reasons and, for example, made of a compound material using a silicon fiber-reinforced organic resin, are often located in areas in which the lightning is preferably attracted to the aircraft, for example the front part of an airplane fuselage 2 or a nacelle under a wing.

The effects of a lightning strike on a structure which is not able to rapidly dispel the energy of the lightning, like an electrically insulating radome structure, are known. The structure concerned can be greatly damaged and even locally destroyed.

To limit the consequences of the lightning strikes on the structure of the radomes, without unacceptably compromising the radiofrequency transparency, many radomes are provided with strips 10 made of electrically conductive material, of small width, linked to the main electrically conductive structure 20 of the aircraft. These strips, called lightning arrester strips, are used to dispel the surface electrical charges that would tend to accumulate on the insulating surface of the radome because of the friction of the aircraft on the air and make it possible to direct the lightning currents to the main structure 20 of the aircraft with a minimum of electrical resistance.

However, a radome may be damaged by a lightning strike.

When this situation occurs in flights intended to test a new radome model, it is very difficult to understand the exact causes of the damage to the radome observed after a flight and in particular to apportion the consequences associated with specific radome characteristics (shapes, materials, etc.) and those associated with the characteristics of the lightning strike or strikes suffered. This separation of the causes is all the more difficult to achieve given that the lightning strike conditions created in a laboratory can sometimes lack representativeness compared to those encountered in a real situation in a flight and that the number of impacts during the flight, the lightning strike points and the intensities of each impact are not known.

When this situation is encountered during an operating flight of an aircraft, the damage to the radome can cause a flight to be interrupted or certain operational performance characteristics of the aircraft to be limited.

If, as is most common, for example as when the radome 1 forms the nose 21 of an airplane in a front area of the fuselage 2, a pilot is neither able to check the real state of the radome nor able to quantify the energy of the lightning strike, which would make it possible to assess a maximum possible damage to the radome, the pilot is not able to decide precisely on what provisions must be made for the end of the flight and must therefore overestimate the risk as a precaution.

Furthermore, the extent of the damage to the radome will be estimated only after landing by the maintenance teams which will then decide on the repairs to be made, in particular if the radome 1 must be replaced before the next flight of the aircraft. Given the tools needed and the need to requisition a replacement radome from the spares shops, the immobilizing of the aircraft risks penalizing the operator of the aircraft whereas a precise knowledge of the risk by the maintenance teams before the aircraft has landed would have made it possible to anticipate the repair actions to be made and reduce the down-time of the aircraft before the return to flight status.

It is therefore particularly important on the one hand when developing an aircraft that the actual lightning strike conditions to which a radome is subjected are perfectly identified to create an accurate relationship between the observed damage and the characteristics of the lightning strikes and, on the other hand for the operation of an aircraft, for the flight crew to be able, in the event of a lightning strike, to estimate the scale of the possible damage to a radome and for the ground crews in charge of maintenance to be able to anticipate the repair operations even before the aircraft arrives at its destination.

SUMMARY

The precise objective of the disclosed embodiments is a device intended to supply the information needed to assess the intensity and the characteristics of a lightning strike and its possible consequences.

According to the disclosed embodiments, a device for detecting lightning strikes on an electrically insulating structure comprising, on an external surface of said structure likely to be subjected to a lightning strike, one or more lightning arrester strips made of electrically conductive material and electrically linked to an electrically conductive structure, comprises at least one inductive sensor positioned relative to the insulating structure in such a way that the at least one inductive sensor delivers a signal when at least one lightning arrester strip is passed through by a lightning current.

Advantageously, to be protected from the lightning by the lightning arrester strips, the inductive sensor or sensors is/are positioned in an internal volume of the electrically insulating structure, on or near an internal surface of the insulating structure, opposite the external surface.

In order to be able to identify the origin of a signal, each inductive sensor is associated by construction with a lightning arrester strip in such a way that the signal delivered by said inductive sensor varies according to the intensity and/or the duration of the current generated by a lightning strike attracted to said lightning arrester strip, and advantageously each lightning arrester strip comprises at least one associated inductive sensor.

Furthermore, in order to determine the lightning arrester strip to which the lightning is attracted, each inductive sensor associated with a lightning arrester strip is positioned near said lightning arrester strip so that the signal delivered by said sensor, induced by a lightning current in the associated lightning arrester strip, is substantially higher than a signal delivered by said sensor induced by an equivalent lightning current in another lightning arrester strip.

In order to store and process the signals obtained from the inductive sensor or sensors, the inductive sensors are connected to means of acquiring said signals, and the acquisition means, for example:

record the signals;

identify the occurrence of a lightning strike;

determine the lightning arrester strip to which the lightning was attracted;

determine an intensity level of the lightning current in the lightning arrester strip;

determine a polarity of a lightning arc.

Depending on the need to have information on the consequences of a lightning strike, the acquisition means or other processing means:

determine a possible level of damage to the electrically insulated structure; and/or create operational limitations of a system dependent on said structure.

To enable a crew or maintenance teams to undertake the actions needed to maintain safety or to repair the structure within the shortest possible delays, advantageously the acquisition means generate a signal, dependent on the signals received from the inductive sensors, intended to inform a crew and/or a remote maintenance team of a risk or of limitations associated with a possible damage to the insulating structure.

To make best use of the existing resources, the functions handled by the acquisition means are, if appropriate, performed by one or more equipment items possibly having other functions not directly related to monitoring the insulating structure.

Given the strong currents involved in a structural strike, advantageously the inductive sensors each include at least one coil, called flat coil, comprising a winding of one or more turns of a conductive wire, of small thickness compared to the other dimensions of said winding which determines a plane of the coil.

To obtain a maximum magnetic flux, each flat coil associated with a lightning arrester strip is positioned so that the associated lightning arrester strip is substantially in the plane of the flat coil.

In a particular arrangement comprising sensors with only one coil, each flat coil associated with a lightning arrester strip is positioned to be locally substantially perpendicular to the internal surface of the insulating structure in order to be less sensitive to the lightning currents that can circulate in the other lightning arrester strips.

In another arrangement which avoids having the coil project inside the internal volume of the insulating structure, a flat coil associated with a lightning arrester strip is positioned to be locally substantially parallel to the internal surface of the insulating structure.

In order to enhance the selectivity of the sensors, preferably an inductive sensor comprises at least two flat coils associated with a lightning arrester strip and positioned so that the signal from a first coil, called forward coil, and the signal from a second coil, called reverse coil, are added together when the signals are generated by a lightning current passing through the associated lightning arrester strip and are subtracted from each other when the signals are generated by one or more lightning arrester strips other than the lightning arrester strip with which the coils are associated.

Advantageously, this result is obtained with a forward coil and a reverse coil, associated with one and the same lightning arrester strip, having substantially the same characteristics—same dimensions and same number of turns—which are positioned laterally in a way that is substantially symmetrical relative to the lightning arrester strip, and which are electrically connected in series so that the winding directions of the turns are reversed between said forward and reverse coils.

The disclosed embodiments are particularly advantageously applicable when the insulating structure is that of a radome and in particular an aircraft radome, in this case the conductive structure to which the lightning arrester strips are electrically connected being that of the aircraft.

The disclosed embodiments therefore also relate to an electrically insulating structure comprising at least one lightning arrester strip on an external surface of said insulating structure likely to be subjected to lightning strikes and which includes at least one inductive sensor maintained fixed relative to the insulating structure, the inductive sensor being able to deliver a signal when the lightning arrester strip with which the sensor is associated is passed through by a lightning current.

In a preferred embodiment, the inductive sensor or sensors is/are maintained in an internal volume of the insulating structure, on or near the internal surface of said insulating structure.

In a particularly advantageous embodiment, the inductive sensors comprise a flat coil or coils that can be fixed to or in the material of the insulating structure, in particular that of a radome.

The disclosed embodiments also relate to a safe and efficient method for detecting lightning strikes on an electrically insulating structure comprising, on an external surface of the structure likely to be subjected to a lightning strike, lightning arrester strips made of an electrically conductive material and electrically linked to an electrically conductive structure, comprising inductive sensors each able to deliver a signal dependent on a current passing through a lightning arrester strip with which the inductive sensor concerned is associated, said method comprising steps involving:

detecting an occurrence of a lightning strike by an analysis of the signals delivered by the inductive sensors and;

measuring said signals delivered by said inductive sensors and;

comparing said signals delivered by said inductive sensors and;

deducing from said signals and from their comparisons the lightning arrester strip to which the lightning was attracted.

Advantageously, the signals delivered on the inductive sensors are used to deduce the intensity I of the lightning current having passed through a lightning arrester strip to which the lightning is attracted and/or to deduce a polarity of the lightning current.

In a particular application of the method of detecting lightning strikes, the behavioral qualities in the presence of lightning strikes of different materials or of different production methods likely to be used to produce a radome structure comprising lightning arrester strips are compared.

According to this application:

a radome is produced, the radome comprising two or more segments, each made with specific materials or production methods, each segment comprising at least one lightning arrester strip;

lightning strikes on the radome are detected and their characteristics recorded;

damage observed for each of the segments is compared taking into account the characteristics of the detected lightning strikes.

In another particular application, the method relates to the determination of a potential damage of a radome.

According to this application:

lightning strikes on the radome are detected and their characteristics recorded;

the characteristics of the detected lightning strikes are compared with the lightning strike characteristics stored in a database.

BRIEF DESCRIPTION OF THE DRAWINGS

The detailed description of the disclosed embodiments is given with reference to the figures which represent:

FIG. 2b illustrates the operation of the device;

FIG. 3b illustrates the operation of the device;

DETAILED DESCRIPTION

A radome 1 comprises a main structure 11 made of insulating material and offering a good radiofrequency transparency intended to protect an antenna 22.

Figure 1:
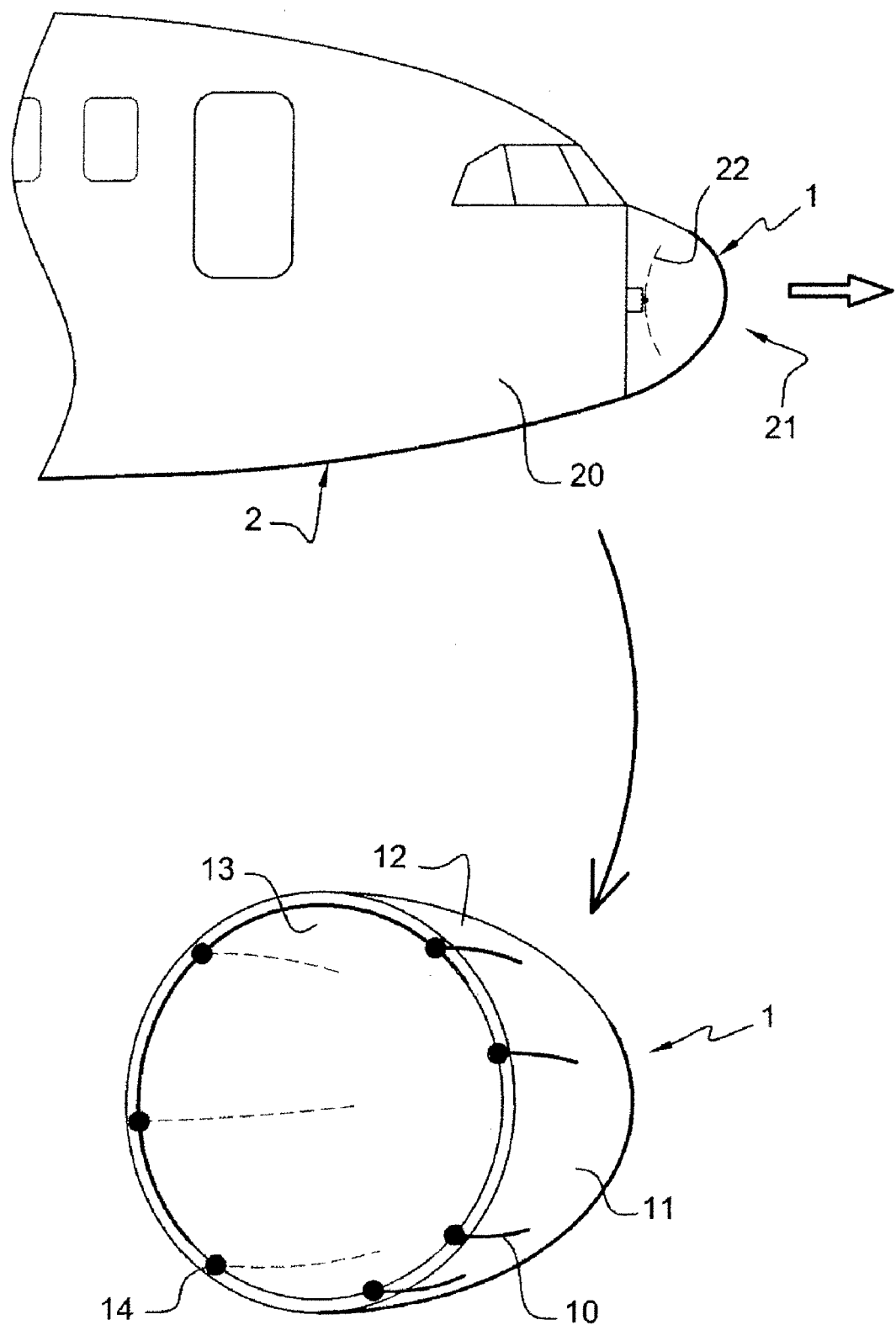
FIG. 1, already cited, the front part of an airplane fuselage and a perspective view to a different scale of a radome separated from the fuselage.

In the exemplary embodiment of the disclosed embodiments described, the radome 1 is a dished radome, having roughly the shape of a paraboloid as illustrated in FIG. 1, as is often used on conventional transport airplanes, the radome being mounted at the front end of a fuselage 2, of which it constitutes an extreme front part 21.

The radome 1 comprises an external surface 12 on the convex side of the paraboloid, in contact with the aerodynamic flow, and an internal surface 13 on the concave side of the paraboloid, which delimits a volume containing antennas 22 to be protected.

This arrangement and this shape are not, however, limiting, and those skilled in the art, on reading about the detailed example described, can adapt the disclosed embodiments to any structure, airborne or not, having electrical characteristics similar to those of a radome, for example a fairing for a magnetic field sensor.

The radome 1 is fixed to a main structure 20 of the aircraft, said structure being conductive, and comprises lightning arrester strips 10 made of a conductive material.

In this explanation, the terms insulating and conductive should be interpreted to mean electrically insulating and electrically conductive respectively, in direct relation to the electrical phenomena of lightning.

The lightning arrester strips 10, one function of which is to conduct the lightning currents on a lightning strike 9 on the radome 1, are located on the external surface 12 of the radome and joined to the insulating structure of the radome. Said strips are electrically linked, at their ends 14 closest to the main structure 20 of the aircraft, to said main structure for example via fixings (not represented) of the radome made of a conductive material. The shape and the number of the lightning arrester strips 10 are not stipulated and they will be determined based on known radome designer techniques.

As illustrated in FIG. 1, the lightning arrester strips 10 are in a known way arranged longitudinally, that is, substantially along the meridians of the paraboloid.

Furthermore, for at least one lightning arrester strip 10, at least one inductive sensor 3, 4 is positioned, preferably on the side of the internal surface 13 of the radome 1 in order not to be directly subjected to the lightning, so that the magnetic field induced by a variation of current I in the lightning arrester strip 10 generates a signal on the terminals 33, 44 of the sensor. The inductive sensor 3, 4 is totally insulated from the lightning arrester strips 10 electrically and is protected from the direct effects of the lightning because of its position in relation to the lightning arrester strip with which it is associated, on the side opposite to that on which the lightning 9 risks being attracted to said lightning arrester strip.

According to the embodiment described, at least one inductive sensor is associated with each lightning arrester strip.

However, one or only some lightning arrester strips, depending on the scale of the detection sought, and the risks associated with the lightning, can be fitted with associated inductive sensors.

An inductive sensor associated with a given lightning arrester strip is preferably placed relative to said lightning arrester strip in order for the signal induced by a magnetic field as a consequence of a current passing through another lightning arrester strip of the radome to be substantially lower than that which would be generated if the current had passed through the lightning arrester strip with which the inductive sensor is associated.

Figure 2A:
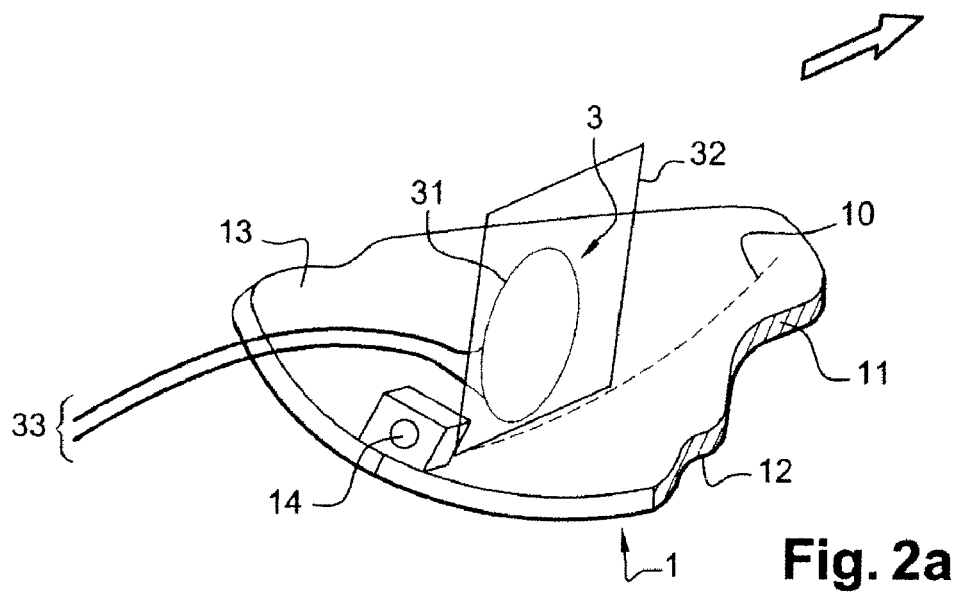
FIGS. 2a and 2b: a diagrammatic detail of a radome at the level of a lightning arrester strip fitted with an inductive sensor comprising a single flat coil.
Figure 3A:
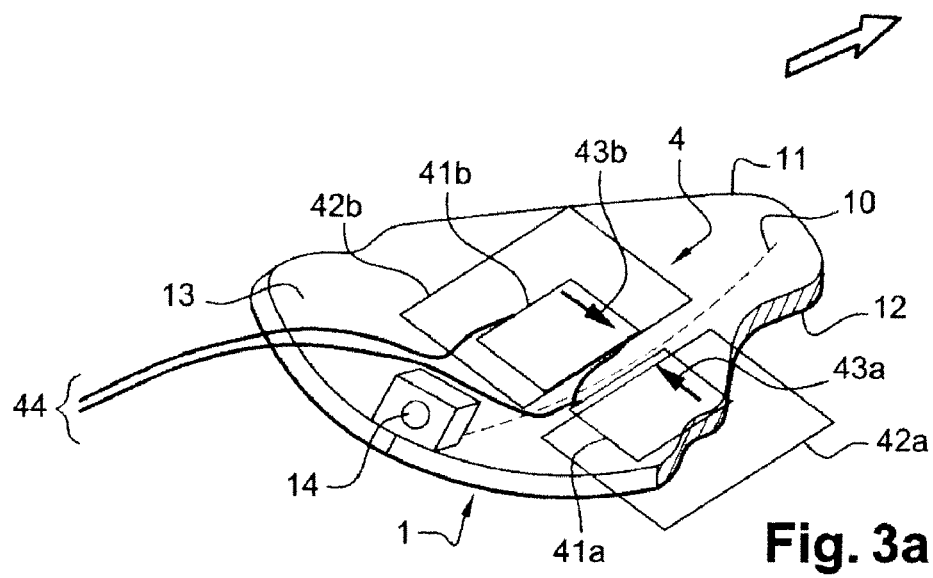
FIGS. 3a and 3b: a diagrammatic detail of a radome at the level of a lightning arrester strip fitted with an inductive sensor comprising two flat coils.

In an embodiment of the device, illustrated in FIGS. 2a and 3a, each inductive sensor 3, 4 of a lightning arrester strip 10 comprises at least one coil 31, 41a, 41b of the flat coil type, that is, a coil consisting of conductive wires forming one or more turns substantially in a plane 32, 42a, 42b, called plane of the coil, and such that the thickness of the coil in a direction perpendicular to its plane is small relative to the other dimensions of the turn or turns that constitute the coil in the plane of said coil, positioned near the lightning arrester strip 10 with which the sensor 3 is associated and such that the flux of the magnetic field B induced by an electric current I in said lightning arrester strip is at its maximum in the flat coil. Preferably, the flat coil 31, 41a, 41b is therefore placed in order for said lightning arrester strip to be substantially in the plane, respectively 32, 42a, 42b, of the flat coil.

Figure 2B:
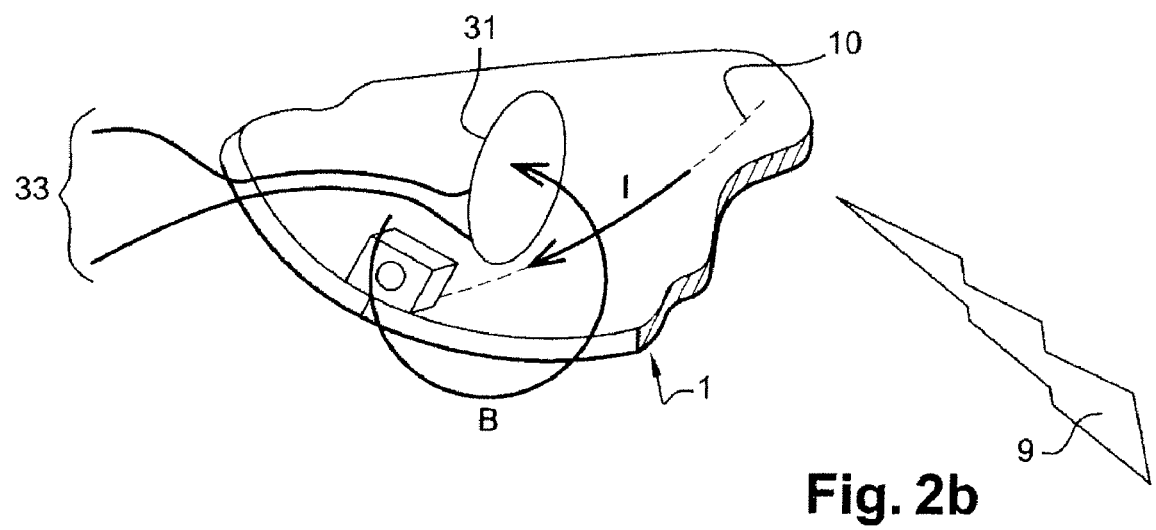

In a first embodiment corresponding to the illustrations of FIGS. 2a and 2b, the coil 3 is fixed in such a way that its plane 32 is substantially perpendicular, locally, to the internal surface 13 of the radome 1, the effect of which is to maximize the magnetic flux originating from a current I in the associated lightning arrester strip because the plane 32 of the coil is substantially perpendicular to the lines of the magnetic field B generated by the current I passing through said lightning arrester strip.

On the other hand, because of the offset in space of the other lightning arrester strips, the lines of the magnetic fields generated by said other lightning arrester strips, in particular the most adjacent lightning arrester strips, are inclined relative to a normal to the plane 32 of the coil 31 and therefore the magnetic fluxes of the fields generated by said other lightning arrester strips passing through the coil 31 are reduced, and because of the greater distances between said other lightning arrester strips and the non-associated coil 31 which cause the intensity of the magnetic field to be reduced at the level of the coil.

It is therefore possible, by comparing the signals generated on a lightning arrester strip on the radome, measured simultaneously by different sensors associated with different lightning arrester strips, to identify the lightning arrester strip to which the lightning is attracted.

Figure 3B:
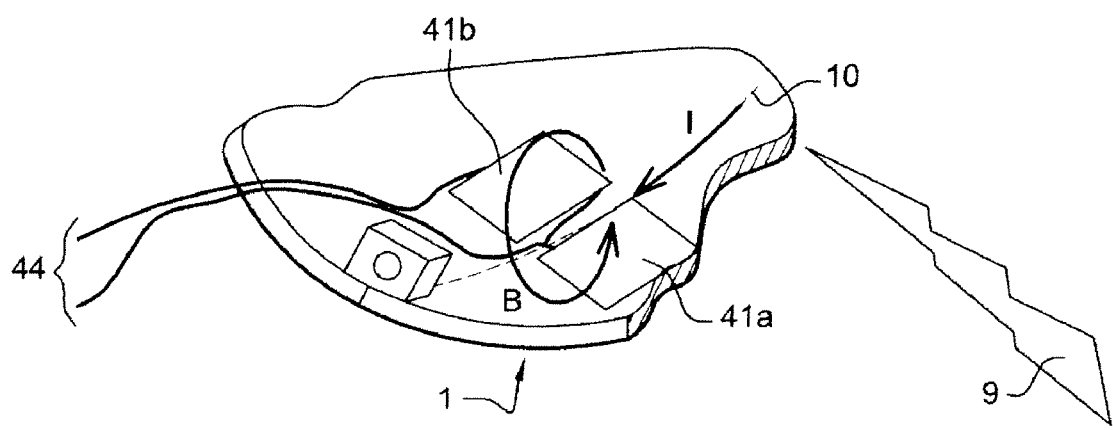

In another embodiment corresponding to the illustrations of FIGS. 3a and 3b, the flat coil 4 is fixed close to the lightning arrester strip 10 with which it is associated with its plane substantially against the internal surface 13 of the radome 1.

In this other embodiment, a single flat coil is less correctly immunized against the magnetic fields likely to be generated by the currents in the other lightning arrester strips and in particular the lightning arrester strips most adjacent on the surface of the radome to the lightning arrester strip concerned. One solution consists for this embodiment in producing a double coil, that is a first coil 41a, called forward coil, placed on the internal surface 13 of the radome 1 on a side of the lightning arrester strip 10 and a second coil, called reverse coil 41b, placed on the same surface 13 of the radome but on the other side of the lightning arrester strip 10 in a substantially symmetrical arrangement. The forward 41a and reverse 41b coils of a lightning arrester strip 10 are also functionally connected for their signals combined at the terminals 44 of the sensor 4 to be added together when the magnetic fluxes passing through said forward and reverse coils originate from the associated lightning arrester strip and for their signals to be subtracted from each other when the magnetic fluxes passing through said forward and reverse coils originate from a lightning arrester strip other than the associated strip.

Such a result is obtained simply by connecting two forward and reverse flat coils 41a, 41b in series and in such a way that the directions 43a, 43b of the windings of said coils are reversed.

Figure 4:
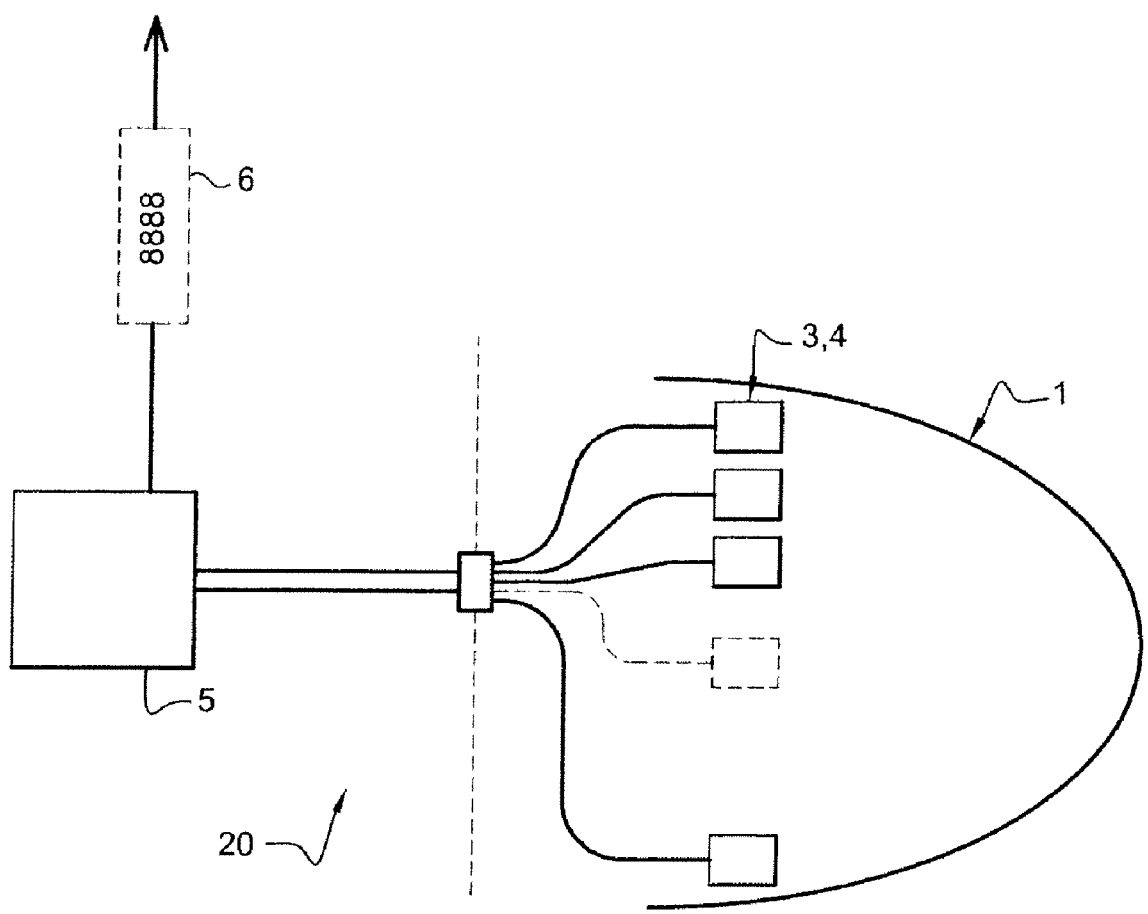
FIG. 4: a theoretical diagram of the device for detecting lightning strikes on the radome.

As diagrammatically represented in FIG. 4, for each lightning arrester strip, the associated inductive sensor 3, 4 is connected to signal acquisition means 5 which record the values of the signals received from all the sensors of the lightning arrester strips.

These signals are stored, for example in a digital memory, and are used to generate, for example by immediate or subsequent digital processing operations, information that can easily be interpreted, for example in terms of lightning strike characteristics or potential damage to the radome 1.

Among the processing operations on the signals received from the inductive sensors, it is advantageous, for example, to:

detect the signals exceeding predetermined thresholds in order to define the occurrence and the intensity of a lightning strike;

count the strikes whose signals exceed the predetermined thresholds to record a log of the lightning strikes on the radome;

compare the signals received by the different sensors on one and the same event to determine the lightning arrester strip or strips to which the lightning is attracted;

record the trend over time of the signal received from a sensor on an event to detect the maximum value of the current spike in the lightning arrester strip, to reconstruct the profile of the current wave and determine the polarity of the lightning arc which can be positive or negative.

In a first embodiment of the device using such a radome, the signals recorded, processed in real time or off line, are analyzed when lightning strikes occur on a radome to correlate the damages to the radome with characteristics of the lightning strikes that the device makes it possible to establish.

For example, in a development phase of a new radome model, it is possible to assess the sensitivity of the radome or of parts of the radome according for example to the material or materials used and/or the production methods implemented to produce the radome and/or the positioning of the lightning arrester strips.

To this end, one method consists in producing a radome comprising segments produced with different materials envisaged. The radomes are generally produced with so-called sandwich structures comprising a lower density material between two cladding skins (an external cladding and an internal cladding), and, for example, an experimental radome is produced in four segments separated by meridians of the paraboloid, a top left segment, a top right segment, a bottom left segment and a bottom right segment, produced using different filler materials (foams of different densities, so-called honeycomb cellular materials using different materials, and so on) and/or by using different cladding materials. The number of segments is not theoretically limited, but in practice, each segment must be big enough to be representative of the tests envisaged and given the distribution of the lightning arrester strips.

When, in a test, the radome is subjected to one or more lightning strikes, the knowledge of the characteristics of said lightning strikes makes it possible to classify the different segments relative to their lightning resistance, the segment that is least damaged for equivalent characteristic impacts making it possible to define the radome structure most resistant to lightning.

Such a development phase also makes it possible to produce a database in which each lightning strike according to its characteristics is associated with a damage to the radome.

In a second embodiment of the device, a damage conversion of a measured signal following a lightning strike is, possibly, produced from the experimental database created at the time of the tests and said database is, where appropriate, added to according to the lightning events to which the aircraft concerned or a fleet of aircraft of the same model have been subjected.

Advantageously, acquisition means 5 receive the signals from the sensors 3, 4, perform the damage conversion of the radome 1 and also establish an aggregate damage to the radome according to all the recorded lightning strikes that the radome 1 has suffered.

Such acquisition means consist, for example, of dedicated equipment which generates an information signal 6 characteristic of the damage to the radome 1, said signal being transmitted during the flight on the one hand to a flight crew of the aircraft, for example by means of a display in the cockpit and, where appropriate, associated with operational limiting set points, and on the other hand, where appropriate, to the ground maintenance teams for the aircraft, for example via a radio technical link between the aircraft and the ground of the "datalink" type.

In one embodiment, the functions of the acquisition means 5 are, at least for certain of them, handled by means of the aircraft carrying the radome 1 that are dedicated to other functions, for example an alarm computer (not represented).

When flat coils 31, 41a, 41b are used as inductive sensors, said coils are made with dimensions and a number N of turns dependent on the power of the signal required at the input of the acquisition means 5 and according to the required sensitivity of the device. In practice, the lightning currents are of high intensities I and vary rapidly, dI/dt being great. The magnetic flux variations, proportional to dI/dt, to which the coils are sensitive are therefore themselves significant and the coils can have relatively small dimensions and comprise only a few turns.

For example, for an ordinary lightning strike case, the lightning current I in the lightning arrester strip is of the order of 50 000 amperes and a coil of 30 mm diameter comprising a single turn (N=1) associated with a lightning arrester strip being passed through by such a lightning current delivers a signal proportional to dI/dt of the order of 50 volts.

One major advantage of the proposed solution stems in particular from the fact that the inductive sensors 3, 4 are not connected to the lightning arrester strips 10 and are themselves protected from lightning by said lighting arrester strips of the radome 1. Thus, the proposed device does not risk conducting lightning currents inside the main structure of the aircraft where sensitive systems are located which could be damaged by such currents.

The invention claimed is:

1. Device for detecting lightning strikes on an electrically insulating structure having an external and an internal surface comprising,
   one or more lightning arrester diversion strips mounted on the external surface and subject to lightning strikes, the lightning arrester diversion strips being made of an electrically conductive material and electrically linked to an electrically conductive structure,
   at least one inductive sensor is fixed on the internal surface of said insulating structure close to at least one of the one or more lightning arrester diversion strips, said at least one inductive sensor being electrically isolated from the at least one of the one or more lightning arrester diversion strips and said at least one inductive sensor being arranged relative to said at least one lightning arrester strip to deliver a signal when a lightning strike causes a current to flow though the at least one lightning arrester diversion strip.

2. The device according to claim 1 in which the at least one inductive sensor is positioned in an internal volume of the insulating structure on or near the internal surface of said electrically insulating structure, so that the current flowing in the at least one of the one or more lightning arrester diversion strips induces the signal delivered by said inductive sensor and said signal varies according to the intensity and/or the duration of the current.

3. The device according to claim 2 in which each of the one or more lightning arrester diversion strips is associated with at least one inductive sensor positioned near the associated lightning arrester diversion strip so that the signal, delivered by said inductive sensor, induced by a current in the associated lightning arrester strip is substantially higher than a signal, delivered by said inductive sensor, that may be induced by a non-associated one or more of the lightning arrester diversion strips.

4. Device according to claim 3 in which the inductive sensors each include at least one flat coil, comprising a winding of one or more turns of an electrically conductive wire, the thickness of said winding being small compared to the other dimensions of said winding to determine a plane of the coil which contains the lightning arrester strip with which said flat coil is associated.

5. The device according to claim 4 in which each flat coil associated with a lightning arrester strip is positioned to be locally substantially perpendicular to the internal surface of the insulating structure.

6. The device according to claim 5 in which at least two flat coils positioned to be locally substantially parallel to the internal surface of the insulating structure are associated with at least one lightning arrester strip and positioned so that the signal from a first coil and the signal from a second coil are added together when the signals are generated by a lightning current passing through said at least one lightning arrester diversion strip and are subtracted from each other when the signals are generated by a current passing through one or more lightning arrester strips other than the lightning arrester strip with which the coils are associated.

7. The device according to claim 5 in which the signals generated by the inductive sensor or sensors are received by acquisition means, which acquisition means perform at least one or more of the functions of:
   a- recording the signals;
   b- identifying the occurrence of a lightning strike;
   c- determining the lightning arrester strip to which the lightning was attracted;
   d- determining an intensity level of the lightning current in the lightning arrester strip;
   e- determining a polarity of a lightning arc;
   f- determining a possible level of damage to the electrically insulated structure;
   g- creating operational limitations of a system dependent on said structure;
   h- generating a signal intended to inform a crew and/or a remote maintenance team of a risk or of limitations associated with a possible damage to the insulating structure.

8. A radome comprising an electrically insulating structure and comprising at least one lightning arrester diversion strip mounted on an external surface of said insulating structure likely to be subjected to lightning strikes, wherein at least one inductive sensor is fixed relative to the insulating structure, in an internal volume of said insulating structure, on or near an internal surface of said insulating structure opposite to the external surface on which the at least one lightning arrester diversion strip is mounted, said at least one inductive sensor being able to deliver a signal when a lightning strike causes a current to flow in the at least one lightning arrester diversion strip.

9. A radome according to claim 8 in which each inductive sensor comprises at least one coil.

10. A method for detecting lightning strikes on an electrically insulating structure having an external surface of said structure likely to be subjected to a lightning strike, lightning arrester diversion strips mounted on the external surface and made of an electrically conductive material electrically linked to an electrically conductive structure, and inductive sensors, each able to deliver a signal dependent on a current passing through a lightning arrester strip with which the inductive sensor concerned is associated, said method comprising:
   detecting an occurrence of a lightning strike by an analysis of the signals delivered by the inductive sensors and;
   measuring said signals delivered by said inductive sensors and;
   comparing said signals delivered by said inductive sensors and;

deducing from said signals and from their comparisons the lightning arrester strip to which the lightning was attracted.

11. A radome according to claim 8 in which the at least one inductive sensor includes at least one flat coil, comprising a winding of one or more turns of an electrically conductive wire, the thickness of said winding being small compared to the other dimensions of said winding to determine a plane of the coil which contains the oppositely mounted lightning arrester diversion strip.

12. The radome according to claim 11 in which each flat coil associated with a lightning arrester strip is positioned to be locally substantially perpendicular to the internal surface of the insulating structure.

13. The radome according to claim 12 in which at least two flat coils positioned to be locally substantially parallel to the internal surface of the insulating structure are associated with at least one lightning arrester diversion strip and positioned so that the signal from a first coil, and the signal from a second coil, are added together when the signals are generated by a lightning current passing through said at least one lightning arrester diversion strip and are subtracted from each other when the signals are generated by a current passing through one or more lightning arrester strips other than the lightning arrester strip with which the coils are associated.

14. The method according to claim 10 comprising:
receiving the signals generated by the inductive sensor or sensors in an acquisition processor; and
processing the signals in the acquisition processor to perform at least one or more of the following functions:
  a- recording the signals;
  b- identifying the occurrence of a lightning strike;
  c- determining the lightning arrester strip to which the lightning was attracted;
  d- determining an intensity level of the lightning current in the lightning arrester strip;
  e- determining a polarity of a lightning arc;
  f- determining a possible level of damage to the electrically insulated structure;
  g- creating operational limitations of a system dependent on said structure;
  h- generating a signal intended to inform a crew and/or a remote maintenance team of a risk or of limitations associated with a possible damage to the insulating structure.

* * * * *

UNITED STATES PATENT AND TRADEMARK OFFICE
CERTIFICATE OF CORRECTION

| | |
|---|---|
| PATENT NO. | : 7,765,864 B2 |
| APPLICATION NO. | : 12/041737 |
| DATED | : August 3, 2010 |
| INVENTOR(S) | : Christophe Bernus |

It is certified that error appears in the above-identified patent and that said Letters Patent is hereby corrected as shown below:

Cover Page, Col. 1, Below "(65) Prior Publication Data", insert -- (30) Foreign Application Priority Data Mar. 07, 2007 (FR) 2007-53685 --.

Signed and Sealed this
First Day of February, 2011

David J. Kappos
*Director of the United States Patent and Trademark Office*